(12) United States Patent
Zhou et al.

(10) Patent No.: US 9,282,488 B1
(45) Date of Patent: Mar. 8, 2016

(54) WIRELESS DEVICE NETWORK SELECTION

(71) Applicant: Sprint Spectrum LP, Overland Park, KS (US)

(72) Inventors: Yu Zhou, Herndon, VA (US); Chunmei Liu, Great Falls, VA (US); Muhammad Naim, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 524 days.

(21) Appl. No.: 13/725,963

(22) Filed: Dec. 21, 2012

(51) Int. Cl.
*H04W 36/00* (2009.01)
*H04W 28/02* (2009.01)

(52) U.S. Cl.
CPC ...... *H04W 36/0016* (2013.01); *H04W 28/0289* (2013.01); *H04W 36/0005* (2013.01); *H04W 36/0022* (2013.01)

(58) Field of Classification Search
None
See application file for complete search history.

(56) References Cited

U.S. PATENT DOCUMENTS

| | | | |
|---|---|---|---|
| 2003/0157927 A1* | 8/2003 | Yi et al. | 455/411 |
| 2010/0014485 A1* | 1/2010 | Henry et al. | 370/331 |
| 2012/0135730 A1* | 5/2012 | Rangaiah et al. | 455/434 |
| 2013/0028081 A1* | 1/2013 | Yang et al. | 370/230 |
| 2014/0141783 A1* | 5/2014 | Xu et al. | 455/436 |

* cited by examiner

*Primary Examiner* — Ashley Shivers

(57) ABSTRACT

A first wireless communication network stores a buffer of data that is concurrently being sent to a wireless device via a first active connection with a second wireless communication network. A first indicator is received by the wireless device. The first indicator is associated with an availability of an access node of the first wireless communication network to serve the wireless device. Based on the first indicator and based on a second indicator of a signal strength associated with the access node, the wireless device ends the first active connection. The first wireless communication network provisions a second active connection to the wireless device. The first wireless communication network provisions the second active connection in response to a request by the wireless device. Data not already received by the wireless device is provided, via the second active connection, to the wireless device.

9 Claims, 7 Drawing Sheets

WIRELESS DEVICE NETWORK SELECTION

TECHNICAL BACKGROUND

From time-to-time, a wireless device such as a Smartphone may be served by networks that belong to a diversity of carriers. For example, the wireless device's primary carrier may not be available in the area where the wireless device is located. In this case, the primary carrier may have an agreement with a second carrier to allow the wireless device to "roam" in the second carrier's service area. In addition, a carrier may move a wireless device being served by its network, to that of a partner in order to reduce the load on the carrier's primary network.

A carrier may, however, have a preference for which network is used to serve the wireless device. This preference may change from time-to-time according to conditions in the networks available to serve the wireless device, the location of the wireless device, or other reasons. Accordingly, when a wireless device is being served by a network which is not preferred, the wireless device may need to be moved to the preferred network.

Overview

In an embodiment, a first wireless communication network stores a buffer of data that is concurrently being sent to a wireless device via a first active connection with a second wireless communication network. The first wireless communication network broadcasts a first indicator. This first indicator is received by the wireless device. The first indicator is associated with an availability of an access node of the first wireless communication network to serve the wireless device. Based on the first indicator and based on a second indicator of a signal strength associated with the access node, the wireless device ends the first active connection. The first wireless communication network provisions a second active connection to the wireless device. The first wireless communication network provisions the second active connection in response to a request by the wireless device. At least a portion of the buffer of data not already received by the wireless device is provided, via the second active connection, to the wireless device.

In an embodiment, a communication system includes an access node. The access node is included in a first wireless communication network. The access node broadcasts a first indicator. This first indicator is received by a wireless device. The first indicator is associated with an availability of the access node to serve the wireless device. Based on the first indicator, and based on a second indicator, the wireless device ends a first active connection with a second wireless communication network. The second indicator corresponds to a signal strength associated with the access node. The communication system also includes a buffer. The buffer stores data concurrently being sent to the wireless device via the first active connection with the second wireless communication network. The first wireless communication network provisions a second active connection to the wireless device in response to a request by the wireless device. The first wireless communication network sends, to the wireless device, data stored in the buffer that has not already been received by the wireless device via the first active connection with the second wireless communication network.

In an embodiment, a first wireless communication network stores a buffer of data that is concurrently being sent to a wireless device via a first active connection with a second wireless communication network. The first wireless communication network sends, via the second wireless communication network, a control message that includes a first indicator. The first indicator is associated with an availability of an access node of the first wireless communication network to serve the wireless device. Based on the first indicator, and based on a second indicator of a signal strength associated with the access node, the wireless device ends the first active connection. In response to a request by the wireless device, the first wireless communication network provisions a second active connection to the first wireless communication network. At least a portion of the buffer of data not already received by the wireless device is provided, via the second active connection, to the wireless device.

In an embodiment, a communication system includes an access node. The access node is included in a first wireless communication network. The access node sends a first indicator to a wireless device via a second wireless communication network. The first indicator is associated with an availability of the access node to serve the wireless device. Based on the first indicator, and based on a second indicator of a signal strength associated with the access node, the wireless device ends a first active connection with the second wireless communication network. The communication system also includes a buffer. The buffer stores data concurrently being sent to the wireless device via the first active connection with the second wireless communication network. The first wireless communication network provisions a second active connection to the wireless device in response to a request by the wireless device. The first wireless communication network sends, to the wireless device, data stored in the buffer that has not already been received by the wireless device via the first active connection with the second wireless communication network.

DETAILED DESCRIPTION

In an embodiment, a wireless device is being served by a low priority network. For example, the wireless device may have been moved to the low priority network when the home (e.g., high priority) network is unreachable. In another example, the wireless device may have been moved to the low priority network when the high priority network is overloaded. When the high priority network becomes available, the wireless device can break (e.g., disconnect) the connection with the low priority network and connect to the high priority network. In this manner, the wireless device can move from the low priority network to the high priority network without receiving permission from the low priority network.

In an embodiment, the wireless device bases the decision to disconnect from the low priority network based on the load on, and signal strength of, an access node in the high priority network. In an embodiment, the load on the access node can be broadcast to the wireless device in system information messages. In an embodiment, the load on the access node can be sent to the wireless device using a control channel linking the high priority network to the wireless device. The load can be sent using a control channel message that is transparent to the low priority network. The signal strength of the access node as received by the wireless device can be determined from the signal strength of the system information messages. When the load is below a threshold, and the signal strength is above a threshold, the wireless device can actively break the connection to the low priority network and connect to the high priority network.

In an embodiment, the high priority network maintains a buffer of data (packets) being sent to the wireless device while it is being served by the low priority network. During a period of time between the ending (breaking) of the connection with the low priority network and the connection with the high priority network, packets sent to the wireless device via the low priority network may be received by the wireless device. The packets in the buffer can be used to resend packets that failed to reach the wireless device during the break-reconnect period. The packets that failed to reach the wireless device during the break-reconnect period can be resent to the wireless device via the high priority network.

Figure 1:
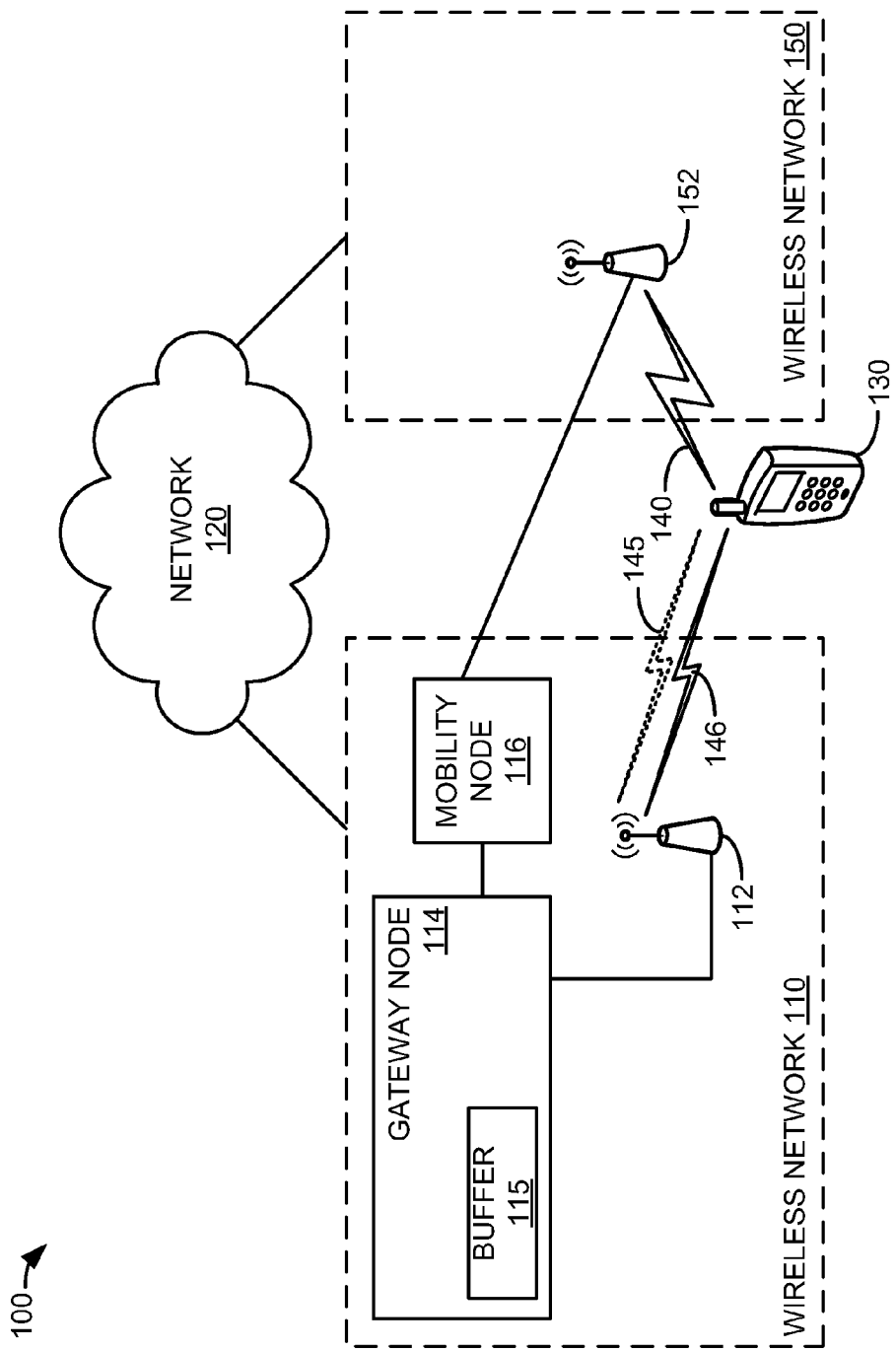
FIG. 1 is a block diagram illustrating an exemplary communication system.

Referring to FIG. 1, communication system 100 comprises wireless network 110, wireless link 140, wireless link 145, wireless link 146, network 120, wireless device 130, and wireless network 150. Wireless network 110 includes access node 112, gateway node 114, and mobility node 116. Wireless network 150 includes access node 152. Wireless network 110 is operatively coupled to network 120. Wireless network 150 is operatively coupled to network 120. Thus, wireless network 110 may be operatively coupled to wireless network 150 via network 120. In addition, wireless network 110 may be operatively coupled directly or indirectly to wireless network 150 without the use of network 120.

Wireless device 130 is operatively coupled to access node 152 via wireless link 140. Wireless device 130 may be operatively coupled to access node 112 via wireless link 145. Wireless device 130 may be operatively coupled to access node 112 via wireless link 146.

Mobility node 116 is operatively coupled to access node 152. Mobility node 116 may be operatively coupled to access node 152 via a control channel. Mobility node 116 may be operatively coupled to access node 152 via a control channel to send and receive control messages.

Access node 112 is a network node capable of providing wireless communication to wireless device 130. Access node 112 can be, for example, a base transceiver station, a radio base station, an eNodeB device, or an enhanced eNodeB device. Access node 112 communicates system information to wireless device 130 via wireless link 145. This system information may be communicated on a unicast (broadcast) paging channel.

The system information may, for example, include a plurality of defined system information blocks (SIBs). These SIBs may include a master information block (MIB) which includes frequently transmitted parameters that are essential for wireless device 130 to initially access wireless network 110. The SIBs may include a SIB that contains parameters needed to determine if access node 112 is suitable for selection.

Wireless network 110 and wireless network 150 are communication networks that can provide wireless communication to wireless device 130. Network 120 is a communication network that can provide communication between wireless network 110 and wireless network 150. Wireless network 110, wireless network 150, and network 120 can comprise wired and/or wireless communication networks that include processing nodes, routers, gateways, physical and/or wireless data links for carrying data among various network elements, including combinations thereof, and can include a local area network, a wide area network, and an internetwork (including the Internet). Wireless network 110, wireless network 150, and network 120 can also comprise wireless networks, including base station, wireless communication nodes, telephony switches, internet routers, network gateways, computer systems, communication links, or some other type of communication equipment, and combinations thereof.

Wired network protocols that may be utilized by wireless network 110, wireless network 150, and/or network 120 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by wireless network 110, wireless network 150, and/or network 120 may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between wireless network 110 and network 120, and between network 120 and wireless network 150, can be, for example, twisted pair cable, coaxial cable or fiber optic cable, or combinations thereof. Wireless link 140, wireless link 145, and/or wireless link 146 can be a radio frequency, microwave, infrared, or other similar signal. Wireless link 140, wireless link 145, and/or wireless link 146 can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 (and present in wireless network 110, network 120, and wireless network 150, in particular) to facilitate wireless communication to/from wireless device 130 but are omitted for clarity, such as base stations, base station controllers, gateways, mobile switching centers, dispatch application processors, and location registers such as a home location register or visitor location register. Furthermore, other network elements may be present to facilitate communication between access node 112 and wireless network 110 which are omitted for clarity, including additional processing nodes, routers, gateways, and physical and/or wireless data links for carrying data among the various network elements. Likewise, other network elements may be present to facilitate communication between access node 152 and wireless network 150 which are also omitted for clarity, including additional processing nodes, routers, gateways, and physical and/or wireless data links for carrying data among the various network elements.

Wireless device 130 may be any device, system, combination of devices, or other such communication platform capable of communicating wirelessly with wireless network 110 and wireless network 150. Wireless device 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data with wireless network 110 via access node 112, and with wireless network 150 via access node 152. Other types of communication platforms are possible.

Wireless device 130 may establish a communication session with wireless network 110 in order to receive communication service. Wireless network 110 may be a home (or primary, preferred, or high priority) network to wireless device 130. This communication service may include voice service and data service. This communication service may include a plurality of services. These services may include but are not limited to telephone service, long distance service, mobile voice service, mobile data service, push-to-talk service, internet service, web browsing, email, pictures, picture messaging, video, video messaging, audio, voicemail, music, MP3's, ring tones, stock tickers, news alerts, and so on.

Wireless device 130 may establish a communication session with wireless network 150 in order to receive communication service. Wireless network 150 may be a roaming (or non-preferred, or low priority) network to wireless device 130. This communication service may include voice service and data service. This communication service may include a plurality of services. These services may include but are not limited to telephone service, long distance service, mobile voice service, mobile data service, push-to-talk service, internet service, web browsing, email, pictures, picture messaging, video, video messaging, audio, voicemail, music, MP3's, ring tones, stock tickers, news alerts, and so on.

In an embodiment, wireless device 130 is, at first, being served by wireless network 150 via wireless link 140. In other words, wireless link 140 is the primary communication path for wireless device 130 to receive communication service. Since wireless network 110 is the home network to wireless device 130, traffic communicated to wireless device 130 is routed through wireless network 110. While wireless device 130 is being served by wireless network 150, wireless network 110 routes this traffic to wireless device 130 via wireless network 150 (e.g., via network 120). Wireless network 110 can also store a buffer 115 of the data (packets) being concurrently sent to wireless device 130 via wireless link 140. Wireless network 110 may maintain a separate buffer 115 for each radio bearer used to carry user data to wireless device 130. Wireless network 110 may keep packets in buffer 115 until a successful delivery acknowledgement is received by wireless network 110. Wireless network 110 may keep packets in buffer 115 until a successful delivery acknowledgement is received by, for example, gateway node 114.

Wireless network 110 broadcasts system information. Wireless device 130 can receive this system information via wireless link 145. An indicator associated with the availability of wireless network 110 serve wireless device 130 can be included in the system information. An indicator associated with the availability of, for example, access node 112, in particular, can be included in the system information. For example, wireless network 110 may broadcast, and wireless device 130 receive, an indicator associated with the load on access node 112.

Wireless device 130 can also measure a signal strength associated with access node 112. This measurement can result in an indicator of a signal strength associated with access node 112. This indicator of signal strength associated with access node 112 can be derived from the signal strength of wireless link 145. Wireless device 130 may receive the indicator associated with the availability of wireless network 110 to serve wireless device 130 and measure the signal strength associated with access node 112 during discontinuous reception cycles.

In an embodiment, when wireless device 130 detects that the indicator associated with the availability of wireless network 110 serve wireless device 130 meets a first threshold, and when the indicator of signal strength associated with access node 112 meets a second threshold, wireless device 130 can actively break its active connection (i.e., wireless link 140) with wireless network 150. For example, when wireless device 130 receives a load indicator that is lower than threshold $Th_{load}$, and measures a signal strength associated with access node 112 that is greater than threshold $Th_{signal}$, wireless device 130 may "hang up" on wireless network 150.

After disconnecting from wireless network 150, wireless device 130 may connect to wireless network 110. Wireless device 130 may connect to wireless network 110 by requesting an active connection with wireless network 110. To connect wireless device 130 to wireless network 110, wireless network 110 may provision wireless link 146. Once wireless device 130 is connected to wireless network 110, wireless network 110 may send to wireless device 130, via wireless link 146, at least a portion of the data stored in buffer 115 that has not already been received by wireless device 130. For example, wireless network 110 may send, via wireless link 146, the packets stored in buffer 115 that have not received a successful delivery acknowledgement.

Figure 2:
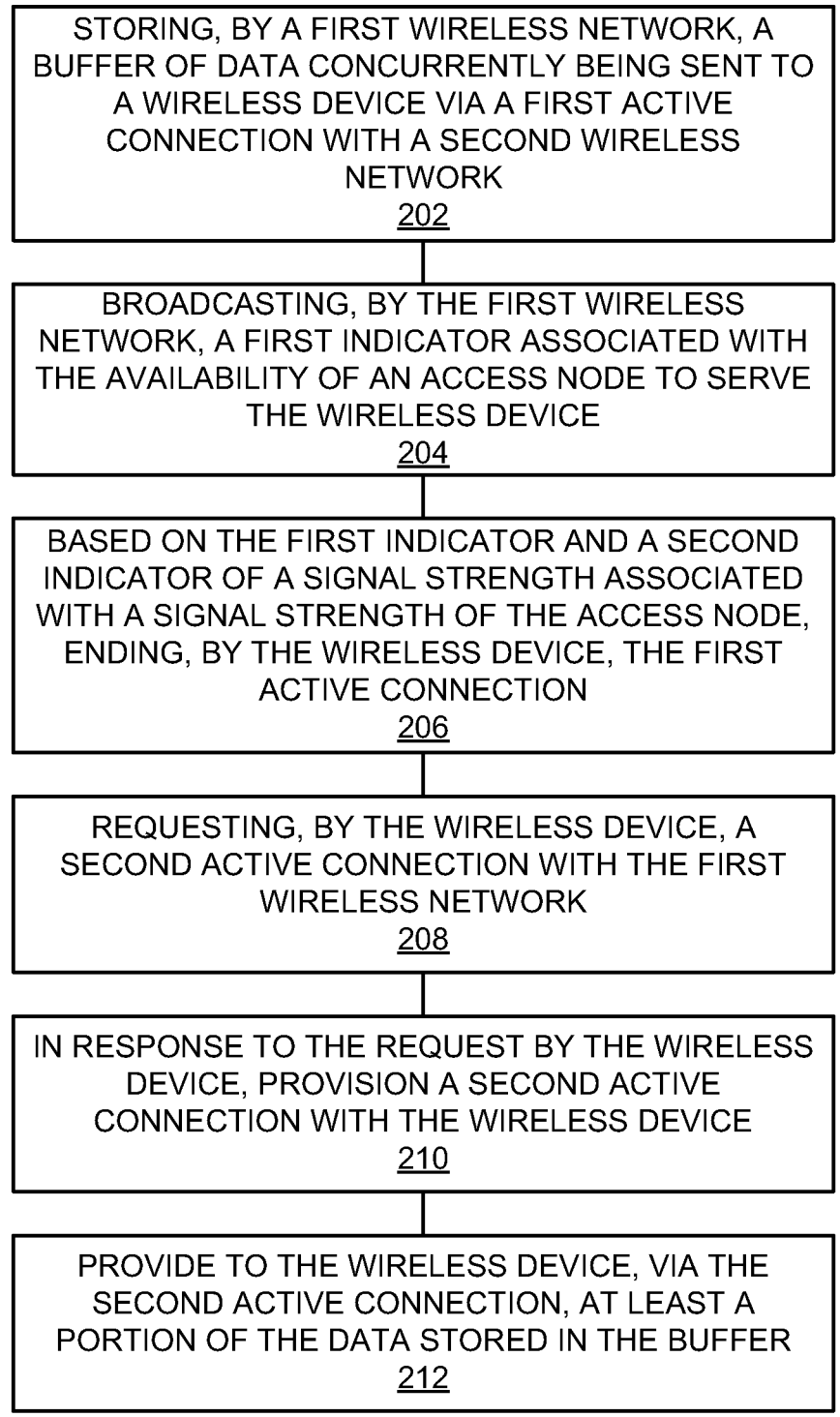
FIG. 2 is a flowchart illustrating an exemplary method of operating a communication system.

FIG. 2 is a flowchart illustrating an exemplary method of operating a communication system. The steps illustrated in FIG. 2 may be performed by one or more elements of communication system 100. A first wireless network stores a buffer of data concurrently being sent to a wireless device via a first active connection with a second wireless network (202). For example, wireless network 110 may store a buffer 115 of data concurrently being sent to wireless device 130 via wireless link 140. Wireless network 110 may maintain a separate buffer 115 for each radio bearer used to carry user data to wireless device 130. Wireless network 110 may keep packets in buffer 115 until a successful delivery acknowledgement is received by wireless network 110. Wireless network 110 may keep packets in buffer 115 until a successful delivery acknowledgement is received by, for example, gateway node 114.

The first wireless network broadcasts a first indicator associated with the availability of an access node to serve the wireless device (204). For example, wireless network 110 may broadcast an indicator associated with the availability of access node 112 to serve wireless device 130. This indicator of the availability of wireless network 110 serve wireless device 130 can be included in the system information. This indicator may correspond to a load on access node 112.

Based on the first indicator, and a second indicator associated with a signal strength of the access node, the wireless device ends the first active connection (206). For example, based on an indicator of the availability of access node 112 to serve wireless device 130 that is received by wireless device 130 from wireless network 110, and a signal strength of access node 112 as measure by wireless device 130, wireless device 130 may actively disconnect from wireless network 150.

The wireless device requests a second active connection with the first wireless network (208). For example, wireless device 130, after disconnecting from wireless network 150, can request, from wireless network 110, a connection to wireless network 110. In response to the request by the wireless device, a second active connection with the wireless device is provisioned (210). For example, in response to a connection request from wireless device 130, wireless network 110 can provision wireless link 146.

At least a portion of the data stored in the buffer is provided to the wireless device via the second active connection (212). For example, wireless network 110 may provide, via wireless link 146, the packets in buffer 115 that have not received a successful delivery acknowledgement.

Figure 3:
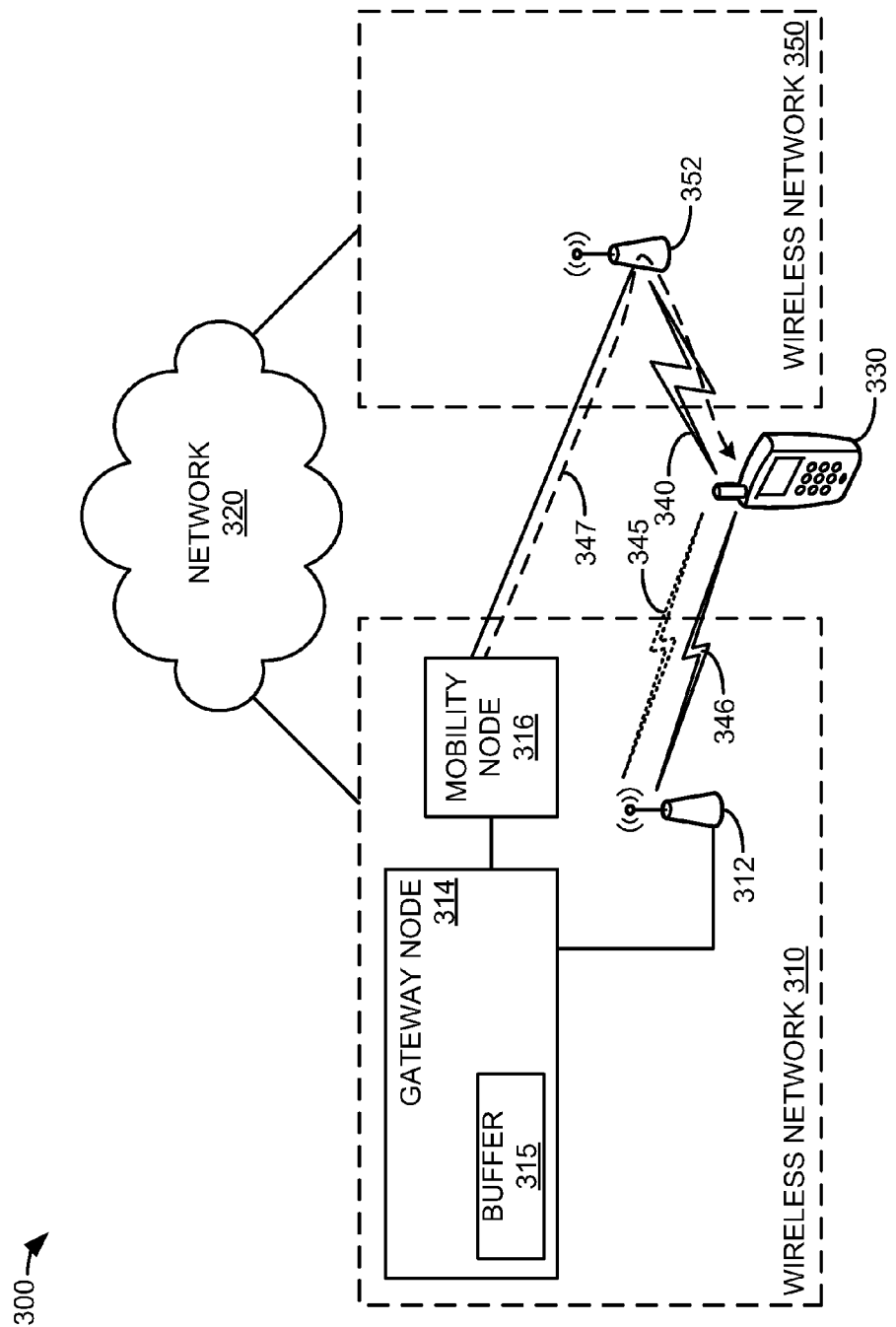
FIG. 3 is a block diagram illustrating another exemplary communication system.

Referring to FIG. 3, communication system 300 comprises wireless network 310, wireless link 340, wireless link 345, wireless link 346, control channel 347, network 320, wireless device 330, and wireless network 350. Wireless network 310 includes access node 312, gateway node 314, and mobility node 316. Wireless network 350 includes access node 352. Wireless network 310 is operatively coupled to network 320. Wireless network 350 is operatively coupled to network 320. Thus, wireless network 310 may be operatively coupled to wireless network 350 via network 320. In addition, wireless network 310 may be operatively coupled directly or indirectly to wireless network 350 without the use of network 320.

Wireless device 330 is operatively coupled to access node 352 via wireless link 340. Wireless device 330 may be operatively coupled to access node 312 via wireless link 345. Wireless device 330 may be operatively coupled to access node 312 via wireless link 346.

Mobility node 316 is operatively coupled to access node 352. Mobility node 316 may be operatively coupled to access node 352 via a control channel. Mobility node 316 may be operatively coupled to access node 352 via a control channel to send and receive control messages.

Wireless device 330 may be operatively coupled to access node 312 via wireless link 345. Wireless device 330 may be operatively coupled to access node 312 via wireless link 346. Wireless network 310 may communicate with wireless device 330 via control channel 347. Control channel 347 can be established between wireless device 330 and wireless network 310 when wireless device 330 is being served by wireless network 350. Control channel 347 can enable communication between, for example, mobility node 316 and wireless device 330 that is transparent to wireless network 350. Control channel 347 can be a direct connection between mobility node 316 and access node 352. Control channel 347 can correspond to, or be, for example, an LTE S1 interface.

Access node 312 is a network node capable of providing wireless communication to wireless device 330. Access node 312 can be, for example, a base transceiver station, a radio base station, an eNodeB device, or an enhanced eNodeB device. Access node 312 communicates system information to wireless device 330 via wireless link 345. This system information may be communicated on a unicast (broadcast) paging channel. Wireless link 345 can be a broadcast communication link.

Wireless network 310 and wireless network 350 are communication networks that can provide wireless communication to wireless device 330. Network 320 is a communication network that can provide communication between wireless network 310 and wireless network 350. Wireless network 310, wireless network 350, and network 320 can comprise wired and/or wireless communication networks that include processing nodes, routers, gateways, physical and/or wireless data links for carrying data among various network elements, including combinations thereof, and can include a local area network, a wide area network, and an internetwork (including the Internet). Wireless network 310, wireless network 350, and network 320 can also comprise wireless networks, including base station, wireless communication nodes, telephony switches, internet routers, network gateways, computer systems, communication links, or some other type of communication equipment, and combinations thereof.

Wired network protocols that may be utilized by wireless network 310, wireless network 350, and/or network 320 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by wireless network 310, wireless network 350, and/or network 320 may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between wireless network 310 and network 320, and between network 320 and wireless network 350, can be, for example, twisted pair cable, coaxial cable or fiber optic cable, or combinations thereof. Wireless link 340, wireless link 345, and/or wireless link 346 can be a radio frequency, microwave, infrared, or other similar signal. Wireless link 340, wireless link 345, and/or wireless link 346 can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 300 (and present in wireless network 310, network 320, and wireless network 350, in particular) to facilitate wireless communication to/from wireless device 330 but are omitted for clarity, such as base station, base station controllers, gateways, mobile switching centers, dispatch application processors, and location registers such as a home location register or visitor location register. Furthermore, other network elements may be present to facilitate communication between access node 312 and wireless network 310 which are omitted for clarity, including additional processing nodes, routers, gateways, and physical and/or wireless data links for carrying data among the various network elements. Likewise, other network elements may be present to facilitate communication between access node 352 and wireless network 350 which are also omitted for clarity, including additional processing nodes, routers, gateways, and physical and/or wireless data links for carrying data among the various network elements.

Wireless device 330 may be any device, system, combination of devices, or other such communication platform capable of communicating wirelessly with wireless network 310 and wireless network 350. Wireless device 330 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data with wireless network 310 via access node 312, and with wireless network 350 via access node 352. Other types of communication platforms are possible.

Wireless device 330 may establish a communication session with wireless network 310 in order to receive communication service. Wireless network 310 may be a home (or primary, preferred, or high priority) network to wireless device 330. This communication service may include voice service and data service. This communication service may include a plurality of services. These services may include but are not limited to telephone service, long distance service, mobile voice service, mobile data service, push-to-talk service, internet service, web browsing, email, pictures, picture messaging, video, video messaging, audio, voicemail, music, MP3's, ring tones, stock tickers, news alerts, and so on.

Wireless device 330 may establish a communication session with wireless network 350 in order to receive communication service. Wireless network 350 may be a roaming (or non-preferred, or low priority) network to wireless device 330. This communication service may include voice service and data service. This communication service may include a plurality of services. These services may include but are not limited to telephone service, long distance service, mobile voice service, mobile data service, push-to-talk service, internet service, web browsing, email, pictures, picture messaging, video, video messaging, audio, voicemail, music, MP3's, ring tones, stock tickers, news alerts, and so on.

In an embodiment, wireless device 330 is, at first, being served by wireless network 350 via wireless link 340. In other words, wireless link 340 is the primary communication path for wireless device 330 to receive communication service. Since wireless network 310 is the home network to wireless device 330, traffic communicated to wireless device 330 is routed through wireless network 310. While wireless device 330 is being served by wireless network 350, wireless network 310 routes this traffic to wireless device 330 via wireless network 350 (e.g., via network 320). The traffic communicated with wireless device 330 from wireless network 310 via wireless network 350 may include control channel traffic. This control channel traffic may be communicated using, for example, the LTE S1 interface.

Wireless network 310 can also store a buffer 315 of the data (packets) being concurrently sent to wireless device 330 via wireless link 340. Wireless network 310 may maintain a separate buffer 315 for each radio bearer used to carry user data to wireless device 330. Wireless network 310 may keep packets in buffer 315 until a successful delivery acknowledgement is received by wireless network 310. Wireless network 310 may keep packets in buffer 315 until a successful delivery acknowledgement is received by, for example, gateway node 314.

Wireless network 310 can send control channel traffic to wireless device 330 via control channel 347. Wireless device 330 can receive this system information via access node 352. An indicator associated with the availability of wireless network 310 serve wireless device 330 can be included in the control channel traffic. An indicator associated with the availability of, for example, access node 312, in particular, can be included in the control channel traffic. For example, wireless network 310 may send, and wireless device 330 receive, an indicator associated with the load on access node 312. Mobility node 316, in particular, may send, and wireless device 330 receive, an indicator associated with the load on access node 312. In an embodiment, the control channel traffic, including the indicator associated with the availability of wireless network 310 to serve wireless device 330, is communicated using the LTE S1 interface.

Wireless device 330 can also measure a signal strength associated with access node 312. This measurement can result in an indicator of a signal strength associated with access node 312. This indicator of signal strength associated with access node 312 can be derived from the signal strength of wireless link 345. Wireless device 330 may measure the signal strength associated with access node 312 during discontinuous reception cycles.

In an embodiment, when wireless device 330 detects that the indicator associated with the availability of wireless network 310 to serve wireless device 330 meets a first threshold, and when the indicator of signal strength associated with access node 312 meets a second threshold, wireless device 330 can actively break its active connection (i.e., wireless link 340) with wireless network 350. For example, when wireless device 330 receives a load indicator that is lower than threshold $Th_{load}$, and measures a signal strength associated with access node 312 that is greater than threshold $Th_{signal}$, wireless device 330 may "hang up" on wireless network 350.

After disconnecting from wireless network 350, wireless device 330 may connect to wireless network 310. Wireless device 330 may connect to wireless network 310 by requesting an active connection with wireless network 310. To connect wireless device 330 to wireless network 310, wireless network 310 may provision wireless link 346. Once wireless device 330 is connected to wireless network 310, wireless network 310 may send to wireless device 330, via wireless link 346, at least a portion of the data stored in buffer 315 that has not already been received by wireless device 330. For example, wireless network 310 may send, via wireless link 346, the packets stored in buffer 315 that have not received a successful delivery acknowledgement.

Figure 4:
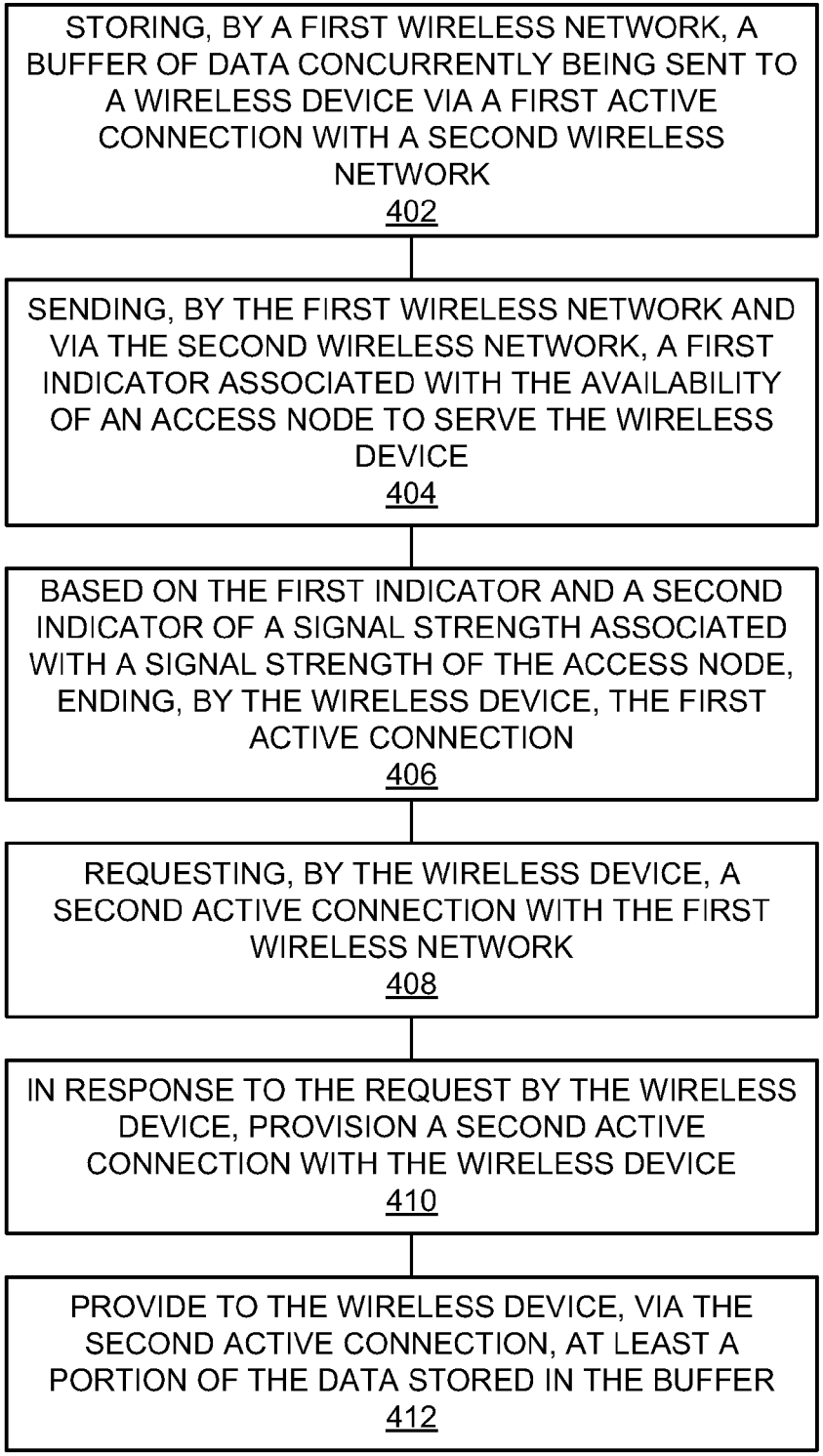
FIG. 4 is a flowchart illustrating another exemplary method of operating a communication system.

FIG. 4 is a flowchart illustrating an exemplary method of operating a communication system. The steps illustrated in FIG. 4 may be performed by one or more elements of communication system 300. A first wireless network stores a buffer of data concurrently being sent to a wireless device via a first active connection with a second wireless network (402). For example, wireless network 310 may store a buffer 315 of data concurrently being sent to wireless device 330 via wireless link 340. Wireless network 310 may maintain a separate buffer 315 for each radio bearer used to carry user data to wireless device 330. Wireless network 310 may keep packets in buffer 315 until a successful delivery acknowledgement is received by wireless network 310. Wireless network 310 may keep packets in buffer 315 until a successful delivery acknowledgement is received by, for example, gateway node 314.

The first wireless network sends, via the second wireless network, a first indicator associated with the availability of an access node to serve the wireless device (404). For example, wireless network 310 may send, via control channel 347, an indicator associated with the availability of access node 312 to serve wireless device 330. This indicator of the availability of wireless network 310 to serve wireless device 330 can be included in the control channel traffic. This indicator can be transparent to wireless network 350. This indicator may correspond to a load on access node 312. This indicator can be sent, for example, using the LTE S1 interface.

Based on the first indicator, and a second indicator associated with a signal strength of the access node, the wireless device ends the first active connection (406). For example, based on an indicator of the availability of access node 312 to serve wireless device 330 that is received by wireless device 330 from wireless network 310, and a signal strength of access node 312 as measure by wireless device 330, wireless device 330 may actively disconnect from wireless network 350.

The wireless device requests a second active connection with the first wireless network (408). For example, wireless device 330, after disconnecting from wireless network 350, can request, from wireless network 310, a connection to wireless network 310. In response to the request by the wireless device, a second active connection with the wireless device is provisioned (410). For example, in response to a connection request from wireless device 330, wireless network 310 can provision wireless link 346.

At least a portion of the data stored in the buffer is provided to the wireless device via the second active connection (412).

For example, wireless network 310 may provide, via wireless link 346, the packets in buffer 315 that have not received a successful delivery acknowledgement.

Figure 5:
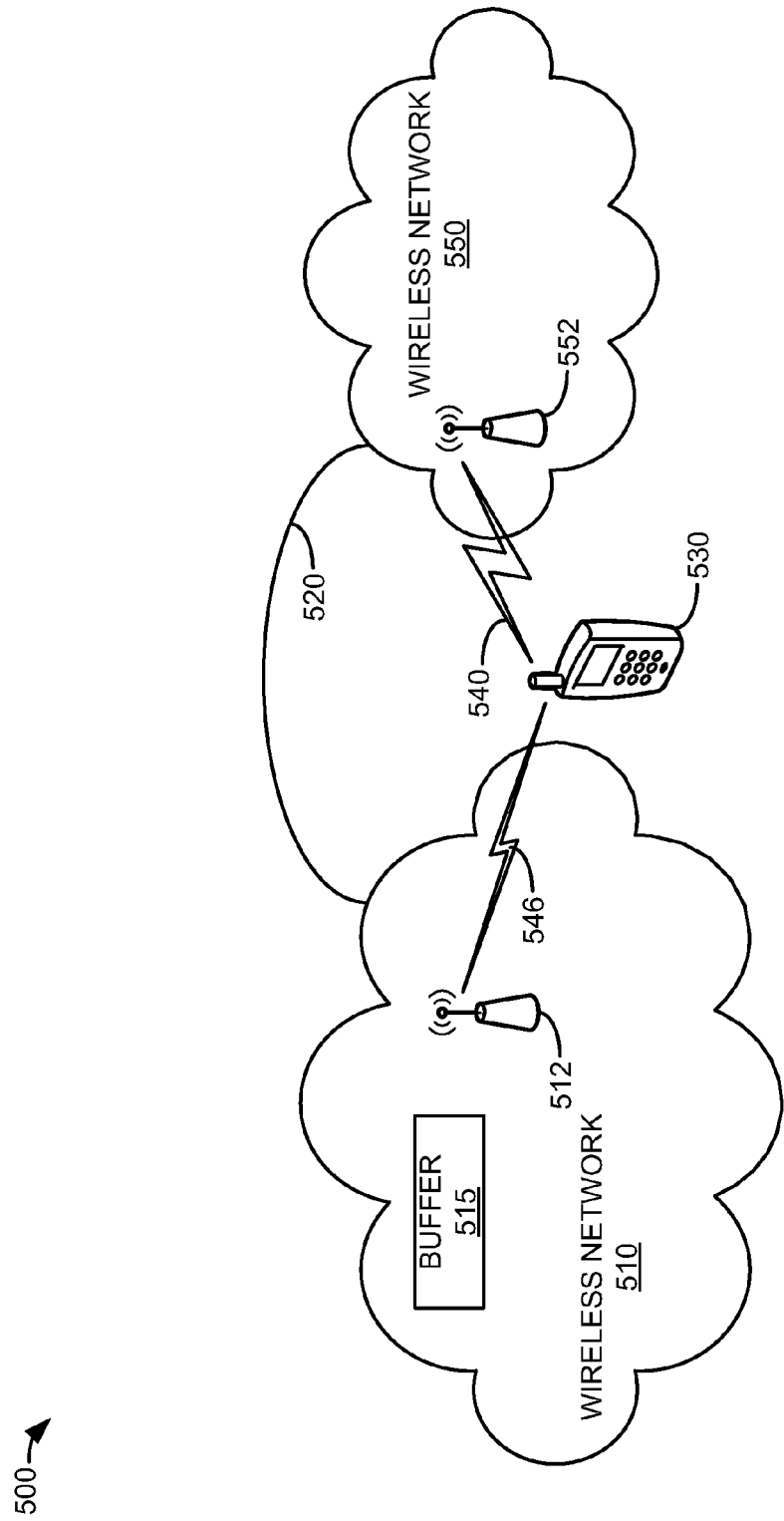
FIG. 5 is a block diagram illustrating a communication system.

FIG. 5 is a block diagram illustrating a communication system. In FIG. 5, communication system 500 comprises wireless network 510, wireless network 550, and wireless device 530. Wireless network 510 and wireless network 550 are operatively coupled by link 520. Wireless network 510 includes access node 512 and buffer 515. Wireless network 550 includes access node 552.

Wireless network 510 and wireless network 550 are communication networks that can provide wireless communication to wireless device 530. Wireless network 510 and wireless network 550 can comprise wired and/or wireless communication networks that include processing nodes, routers, gateways, physical and/or wireless data links for carrying data among various network elements, including combinations thereof, and can include a local area network, a wide area network, and an internetwork (including the Internet). Wireless network 510 and wireless network 550 can also comprise wireless networks, including base stations, wireless communication nodes, telephony switches, internet routers, network gateways, computer systems, communication links, or some other type of communication equipment, and combinations thereof.

Wired network protocols that may be utilized by wireless network 510 and wireless network 550 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by wireless network 510 and wireless network 550 can comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Wireless link 540 and wireless link 546 can be radio frequency, microwave, infrared, or other similar signal. Wireless link 540 and/or wireless link 546 can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 500 (and present in wireless network 510 and wireless network 550, in particular) to facilitate wireless communication to/from wireless device 530 but are omitted for clarity, such as base stations, base station controllers, gateways, mobile switching centers, dispatch application processors, and location registers such as a home location register or visitor location register. Furthermore, other network elements may be present to facilitate communication between access node 512 and wireless network 510 which are omitted for clarity, including additional processing nodes, routers, gateways, and physical and/or wireless data links for carrying data among the various network elements. Likewise, other network elements may be present to facilitate communication between access node 552 and wireless network 550 which are also omitted for clarity, including additional processing nodes, routers, gateways, and physical and/or wireless data links for carrying data among the various network elements.

Wireless device 530 may be any device, system, combination of devices, or other such communication platform capable of communicating wirelessly with wireless network 510 and wireless network 550. Wireless device 530 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data with wireless network 510 via access node 512, and with wireless network 550 via access node 552. Other types of communication platforms are possible.

Wireless device 530 may establish a communication session with wireless network 510 in order to receive communication service. Wireless network 510 may be a home (or primary, preferred, or high priority) network to wireless device 530. This communication service may include voice service and data service. This communication service may include a plurality of services. These services may include but are not limited to telephone service, long distance service, mobile voice service, mobile data service, push-to-talk service, internet service, web browsing, email, pictures, picture messaging, video, video messaging, audio, voicemail, music, MP3's, ring tones, stock tickers, news alerts, and so on.

Wireless device 530 may establish a communication session with wireless network 550 in order to receive communication service. Wireless network 550 may be a roaming (or non-preferred, or low priority) network to wireless device 530. This communication service may include voice service and data service. This communication service may include a plurality of services. These services may include but are not limited to telephone service, long distance service, mobile voice service, mobile data service, push-to-talk service, internet service, web browsing, email, pictures, picture messaging, video, video messaging, audio, voicemail, music, MP3's, ring tones, stock tickers, news alerts, and so on.

Access node 512 and access node 552 are network nodes capable of providing wireless communication to wireless device 530. Access node 512 and/or access node 552 can be, for example, a base transceiver station, a radio base station, an eNodeB device, or an enhanced eNodeB device. Access node 512 can communicate system information to wireless device 530. This system information may be communicated on a unicast (broadcast) paging channel. Access node 552 can communicate control channel traffic to wireless device 530 via wireless link 540. Access node 552 can communicate control channel traffic from wireless network 510 to wireless device 530 via wireless link 540.

In an embodiment, wireless device 530 may have, at first, a first active connection with wireless network 550 via wireless link 540. In other words, wireless link 540 is the primary communication path for wireless device 530 to receive communication service. Wireless network 550 can be a low priority network to wireless device 530.

While wireless device 530 has the first active connection with wireless network 550, traffic communicated to wireless device 530 can be routed through wireless network 510. Wireless network 510 can also store a buffer 515 of data (packets) being concurrently sent to a wireless device 530 via wireless link 540. Wireless network 510 may maintain a separate buffer 515 for each radio bearer used to carry user data to wireless device 530. Wireless network 510 may keep these packets in buffer 515 until a successful delivery acknowledgement is received by wireless network 510.

Wireless device 530 may also receive, from wireless network 510, a first indicator that is associated with an availability of wireless network 510 to serve wireless device 530.

Wireless network 510 can be a higher priority network than wireless network 550 is to wireless device 530. This first indicator may be associated with a load on access node 512. Wireless device 530 may receive this first indicator via a broadcast transmitted by access node 512. Wireless device 530 may receive this first indicator via control channel traffic from wireless network 510.

Wireless device 530 can measure or receive a second indicator that is associated with a signal strength of access node 512. In response to the first indicator and the second indicator, wireless device 530 can break the first active connection with wireless network 550. For example, when wireless device 530 receives a load indicator that is lower than threshold $Th_{load}$, and determines that the second indicator is greater than threshold $Th_{signal}$, wireless device 530 may break the first active connection.

Wireless device 530 can establish a second active connection with wireless network 510. In other words, after breaking wireless link 540, wireless device 530 can establish wireless link 540 is the primary communication path for wireless device 530 to receive communication service.

Wireless device 530 can receive, via the second active wireless connection, data sent by wireless network 510 to wireless network 550 for communication via the first active connection. For example, data stored in buffer 515 that was not successfully acknowledged after it was sent to wireless network 550 may be received by wireless device 530 via the second active connection. Data stored in buffer 515 that was not successfully acknowledged after it was sent to wireless network 550 may be sent by wireless network 510 to wireless device 530 via the second active connection.

Figure 6:
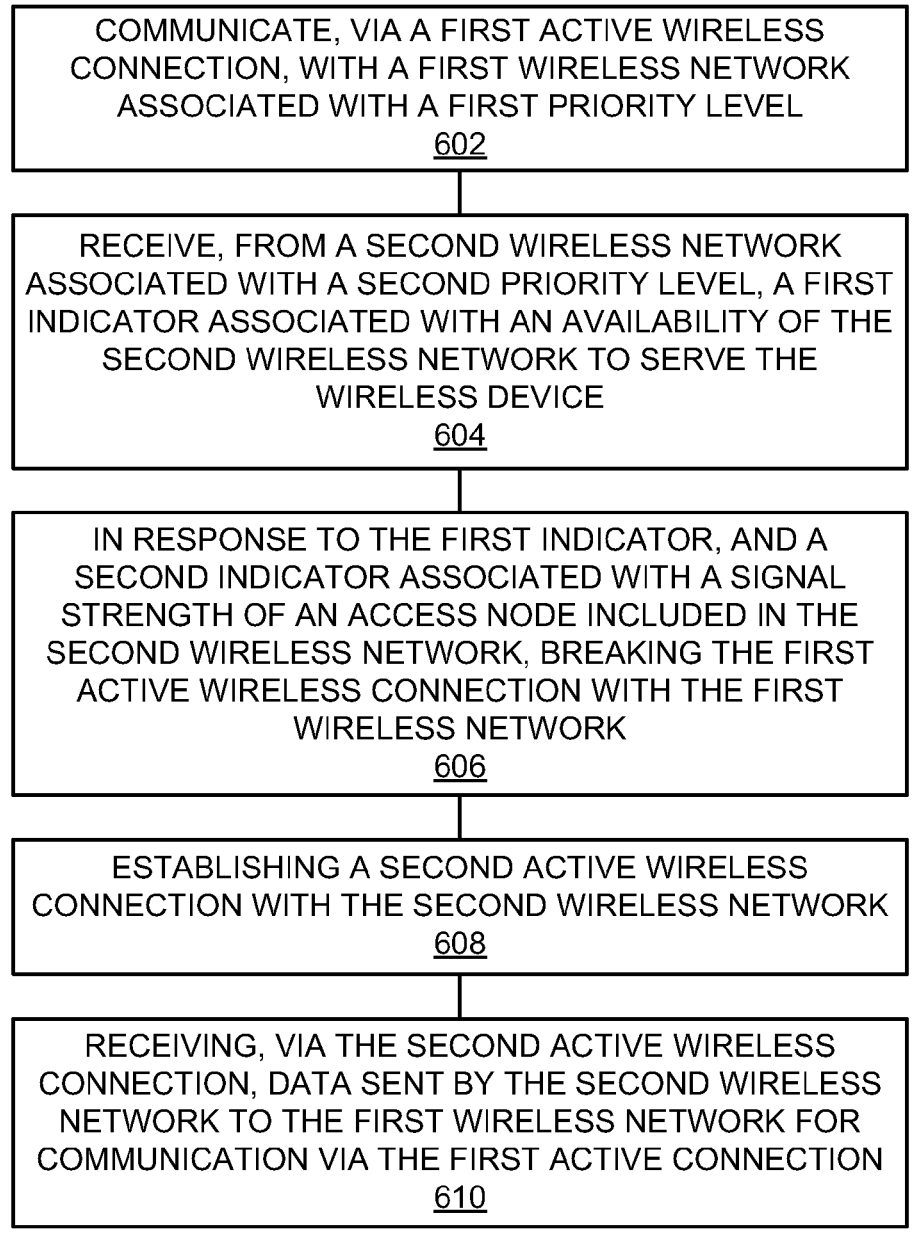
FIG. 6 is a flowchart illustrating an exemplary method for operating a wireless device.

FIG. 6 is a flowchart illustrating an exemplary method for operating a wireless device. The steps illustrated in FIG. 6 can be performed by elements of communication system 100, communication system 300, and/or communication system 500. Via a first active wireless connection, a first wireless network associated with a first priority level is communicated with (602). For example, wireless device 530 may communicate with wireless network 550 using wireless link 540 as the primary communication path for wireless device 530 to receive communication service.

From a second wireless network associated with a second priority level, a first indicator associated with an availability of the second wireless network to serve the wireless device is received (604). For example, wireless device 530 may receive, from wireless network 510, an indicator associated with the availability of wireless network 510 to serve as the primary communication path for wireless device 530 to receive communication service. This indicator may, for example, be associated with a load on access node 512.

In response to the first indicator, and a second indicator associated with a signal strength of an access node included in the second wireless network, the first active connection with the first wireless network is broken (606). For example, in response to the indicator associated with the availability of wireless network 510 to serve as the primary communication path for wireless device 530, and an indicator of the signal strength of access node 512, wireless device 530 may break its connection with wireless network 550 as the primary communication path for wireless device 530 to receive communication service. Wireless device 530 may measure or receive the indicator of the signal strength associated with access node 512.

A second active connection with the second wireless network is established (608). For example, after disconnecting from wireless network 550, wireless device 530 may connect with wireless network 510 as the primary communication path for wireless device 530 to receive communication service.

Via the second active wireless connection, data sent by the second wireless network to the first wireless network for communication via the first active connection is received (610). For example, data stored in buffer 515 may be sent to wireless device 530 via wireless link 546. This data, which was originally sent to wireless network 550 for communication to wireless device 530 via wireless link 540, may be sent via access node 512. Wireless device 530 can receive this data.

Figure 7:
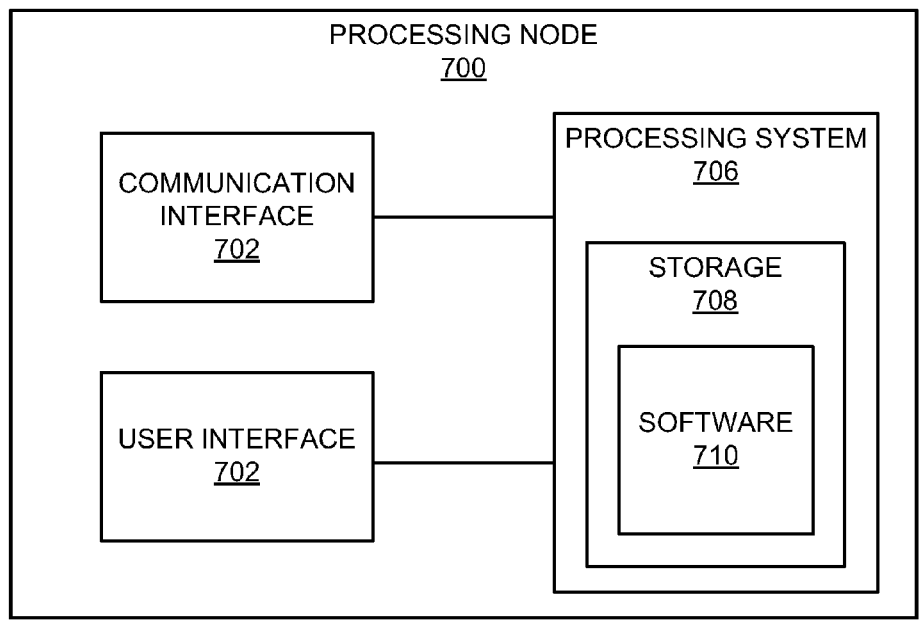
FIG. 7 illustrates a processing node.

FIG. 7 illustrates an exemplary processing node 700 comprising communication interface 702, user interface 704, and processing system 706 in communication with communication interface 702 and user interface 704. Processing node 700 is capable of paging a wireless device. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

An example of processing node 700 includes access node selection node 410. Processing node 700 can also be an adjunct or component of a network element, such as an element of access node 112, 152, 312, 352, 512 and/or 552, a mobility management entity, a gateway, a proxy node, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
    storing, at a network node of a preferred wireless network, a buffer of data packets concurrently being routed to a wireless device via an access node of a non-preferred wireless network;
    sending, via a control channel of the preferred wireless network, a load indicator associated with an access node of the preferred wireless network to the wireless device and, when the load indicator meets a first threshold, instructing the wireless device to measure a signal strength indicator of the access node of the preferred wireless network;
    instructing the wireless device via the control channel to break a first active connection with the access node of the non-preferred wireless network when the measured signal strength indicator meets a second threshold;
    in response to a request by the wireless device, provisioning, by the preferred wireless network, a second active connection between the access node of the preferred wireless network and the wireless device; and
    providing to the wireless device, via the second active connection, at least a portion of the buffer of data not acknowledged as received by the wireless device.

2. The method of claim 1, wherein the load indicator corresponds to an availability of the access node of the preferred wireless network to serve the wireless device.

3. The method of claim 1, wherein the load indicator is sent to the wireless device over the control channel in a system information block.

4. A communication system, comprising:
    a network node of a preferred wireless network, the network node configured to broadcast, by a control channel, a load indicator to a wireless device that is associated with an availability of an access node of the preferred wireless network to serve the wireless device,
    wherein the access node is configured to instruct the wireless device to end a first active connection with an access node of a non-preferred wireless network based on the load indicator meeting a first threshold and based on a determined signal strength of the access node of the preferred wireless network meeting a second threshold; and,
    a buffer node of the preferred wireless network, the buffer node configured to store data concurrently being routed to the wireless device via the first active connection, wherein the preferred wireless network provisions a second active connection to the wireless device in response to a request by the wireless device, the preferred wireless network sending to the wireless device via the second active connection at least a portion of the data stored at the buffer node and not successfully acknowledged as received by the wireless device.

5. The communication system of claim 4, wherein the load indicator corresponds to a load on the access node of the preferred wireless network.

6. The communication system of claim 4, wherein the load indicator is broadcast to the wireless device from the preferred wireless network in a system information block.

7. A method of operating a communication system, comprising:
    storing, at an access node of a high priority network, a buffer of data concurrently being sent to a wireless device via an access node of a low priority network;
    sending, by a network node of the high priority network and via the access node of the low priority network, a control message to the wireless device that includes a load indicator associated with an availability of the access node of the high priority network to serve the wireless device;
    determining a signal strength of the access node of the high priority network;
    based on the load indicator meeting a first threshold criteria and the signal strength meeting a second threshold criteria, instructing the wireless device via a control channel of the high priority network to break a first active connection with the access node of the low priority network;
    in response to a request by the wireless device, provisioning, by high priority network, a second active connection to the access node of the high priority network; and,
    providing to the wireless device, via the second active connection, at least a portion of the buffer of data not acknowledged as received by the wireless device.

8. The method of claim 7, wherein the load indicator corresponds to a load on the access node of the high priority network.

9. The method of claim 7, further comprising:
    determining, by the network node of the high priority network, the portion of the buffer of data not acknowledged as received by the wireless device based on an acknowledgement indicator received from the wireless device.

* * * * *